(12) United States Patent
Rychlik (10) Patent No.: US 7,962,731 B2
(45) Date of Patent: Jun. 14, 2011

(54) BACKING STORE BUFFER FOR THE REGISTER SAVE ENGINE OF A STACKED REGISTER FILE

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/254,320

(22) Filed: Oct. 20, 2005

(65) Prior Publication Data

US 2007/0094484 A1 Apr. 26, 2007

(51) Int. Cl.
G06F 9/00 (2006.01)
(52) U.S. Cl. ............. 712/228; 712/E9.027; 712/E9.024
(58) Field of Classification Search .................. 712/228, 712/E9.024
See application file for complete search history.

(56) References Cited

U.S. PATENT DOCUMENTS

| | | | |
|---|---|---|---|
| 4,429,363 A * | 1/1984 | Duke et al. .................... | 711/122 |
| H1291 H | 2/1994 | Hinton et al. | |
| 5,530,870 A * | 6/1996 | De Bruler ..................... | 717/155 |
| 6,078,970 A | 6/2000 | Nordstrom et al. | |
| 6,128,728 A * | 10/2000 | Dowling ....................... | 712/228 |
| 6,243,668 B1 * | 6/2001 | Le et al. ........................ | 703/27 |
| 6,263,401 B1 * | 7/2001 | Ross et al. ..................... | 711/109 |
| 6,314,513 B1 | 11/2001 | Ross et al. | |
| 6,336,154 B1 * | 1/2002 | McCarthy et al. .............. | 710/35 |
| 6,408,325 B1 * | 6/2002 | Shaylor ......................... | 718/108 |
| 6,487,630 B2 * | 11/2002 | Bui ................................ | 711/109 |
| 6,578,137 B2 * | 6/2003 | Parady .......................... | 712/228 |
| 6,631,452 B1 | 10/2003 | Lin | |
| 6,665,793 B1 | 12/2003 | Zahir et al. | |
| 6,751,749 B2 | 6/2004 | Hofstee et al. | |
| 6,799,269 B2 | 9/2004 | Dowling | |
| 7,093,110 B2 * | 8/2006 | Okawa et al. ................. | 712/228 |
| 7,127,592 B2 | 10/2006 | Abraham et al. | |
| 2002/0056024 A1 | 5/2002 | Bui | |
| 2002/0116662 A1 | 8/2002 | Hofstee et al. | |

(Continued)

FOREIGN PATENT DOCUMENTS

| | | |
|---|---|---|
| EP | 0676691 | 10/1995 |
| EP | 0955583 | 11/1999 |
| KR | 100868410 | 11/2008 |

(Continued)

OTHER PUBLICATIONS

"Intel IA-64 Architecture Software Developer's Manual" vol. 1: IA-64 Application Architecture; Rev. 1.1, Jul. 2000; pertinent pp. 3-2 to 3-6, 4-1 to 4-4.*

(Continued)

Primary Examiner — Idriss N Alrobaye
(74) Attorney, Agent, or Firm — Peter M. Kamarchik; Nicholas J. Pauley; Jonathan Velasco (57) ABSTRACT

A Backing Store Buffer is interposed between a Physical Register File and the Backing Store in a stacked register file architecture. A Register Save Engine temporarily stores data from registers in the Physical Register File allocated to inactive procedures on-chip, freeing the registers to be re-allocated to new procedures. When the a procedures complete and returns control to a prior, inactive procedure, the Register Store Engine retrieves data associated with the inactive procedure from the Backing Store Buffer to registers in the Physical Register File, and the registers are re-allocated to the inactive procedure. The Register Save Engine saves data from the Backing Store Buffer to the Backing Store, incurring the significant performance degradation and power consumption required for off-chip RAM access, only when the Backing Store Buffer is full and more data must be saved from the Physical Register File.

3 Claims, 4 Drawing Sheets

U.S. PATENT DOCUMENTS

| | | | | |
|---|---|---|---|---|
| 2003/0051124 | A1 | 3/2003 | Dowling | |
| 2004/0064632 | A1* | 4/2004 | Lin | 711/100 |
| 2004/0133766 | A1* | 7/2004 | Abraham et al. | 712/217 |
| 2006/0047921 | A1* | 3/2006 | Kumar | 711/154 |
| 2006/0294344 | A1* | 12/2006 | Hsu et al. | 712/228 |
| 2007/0106885 | A1 | 5/2007 | Rychlik | |

FOREIGN PATENT DOCUMENTS

| | | |
|---|---|---|
| RU | 2193228 | 11/2002 |
| WO | 9621186 | 7/1996 |
| WO | 0182059 | 11/2001 |

OTHER PUBLICATIONS

Jayaraj et al. "Shadow Register File Architecture: A mechanism to reduce context switch latency" Published: 2003, IEEE.*

"Microsoft Computer Dictionary, Fifth Edition" pertinent p. 76.*

"Intel IA-64 Architecture software Developer's Manual" vol. 2: IA-64 System Architecture; Rev. 1.1, Jul. 2000. Pertinent pp. 6-1 to 6-16.*

International Preliminary Report on Patentability—PCT/US06/060128, The International Bureau of WIPO, Geneva Switzerland—Apr. 23, 2008.

International Search Report—PCT/US06/060128, International Search Authority—European Patent Office— May 7, 2007.

Juame Abella; Antonio Gonzales "On Reducing Register Pressure and Energy in Multiple-Banked Register Files".

Written Opinion—PCT/US06/060128, International Search Authority—European Patent Office—May 7, 2007.

* cited by examiner

BACKING STORE BUFFER FOR THE REGISTER SAVE ENGINE OF A STACKED REGISTER FILE

BACKGROUND

The present invention relates generally to the field of processors and in particular to a Backing Store Buffer for a Register Save Engine in a stacked register file architecture.

RISC processors are characterized by relatively small instruction sets, wherein each instruction performs a single instruction, such as an arithmetic, logical, or load/store operation. Arithmetic and logical instructions obtain their operands from, and write their results to, one or more General Purpose Registers (GPR). GPRs are architected registers. That is, they comprise discrete memory locations explicitly identified in the instruction set architecture, and are directly addressed by instructions.

GPRs are often implemented in hardware as an array of high-speed, multi-ported registers, each having a word width defined by the instruction set (e.g., 32 or 64 bits). This array of physical registers is referred to as a Physical Register File. In a direct-mapped register implementation, the number of registers in the Physical Register File exactly matches the number of architected GPRs, and each logical GPR identifier maps to a specific hardware register. For higher performance, and to support superscaler pipelines, many modern processors decouple logical GPR identifiers from physical registers in the Physical Register File. Register renaming, reorder buffers, and the like are techniques known in the art for decoupling logical GPR identifiers from physical registers. Whether directly mapped or renamed, management of the Physical Register File across numerous software procedures is a design challenge, and is often a performance bottleneck.

Most modern software is modular in nature. That is, one procedure may "call," or transfer control to, another procedure (variously referred to as a function, subroutine, submodule, or the like). The called procedure may in turn call another procedure, and so on, resulting in procedure nesting, often to a considerable depth. During execution by a processor, each procedure (also referred to as a context) is allocated certain processor resources, including a number of GPRs. The number of GPRs allocated to a procedure may be determined by a compiler's analysis of instructions in the procedure, and may range from a few GPRs to the full architected set of GPRs. When a first procedure calls a second procedure (also known as a context switch), the first, or calling, procedure goes inactive while the second, or called, procedure is allocated separate resources, including its own set of GPRs, and begins execution. When the second procedure completes execution, its resources are deallocated, resources are re-allocated to the calling procedure (if necessary), and the calling procedure resumes execution.

In some prior art processors, such as for example the Intel i-960, a context switch, or new procedure, prompts the processor to store the entire contents of the Physical Register File to memory, making the entire Physical Register File available to the new procedure. When a called procedure completes execution and returns control to its calling procedure, the previously saved register values are restored to the Physical Register File, and execution of the calling procedure continues. The Physical Register File contents are saved to a "Backing Store," such as system memory (RAM). To mitigate the performance impact of multiple off-chip memory accesses for every context switch when the Backing Store comprises off-chip RAM, a processor may provide one or more "shadow" or "cache" register files—which may comprise actual registers or alternatively may comprise an on-chip cache memory—for storing the contents of the Physical Register File. However, the entire Physical Register File must be stored/retrieved at one time, imposing a performance hit, even in the case of shadow register storage.

A technique employed by many modern processors, that obviates the need to store and retrieve the entire Physical Register File at one time, is known as a stacked register file architecture. In a stacked register file architecture, the high-level processor controller considers the Physical Register File to be a logical stack of infinite depth. This logically infinite stack is implemented in the Physical Register File by incrementally allocating registers to procedures as they are called, and saving the contents of previously allocated registers as necessary.

Figure 1:
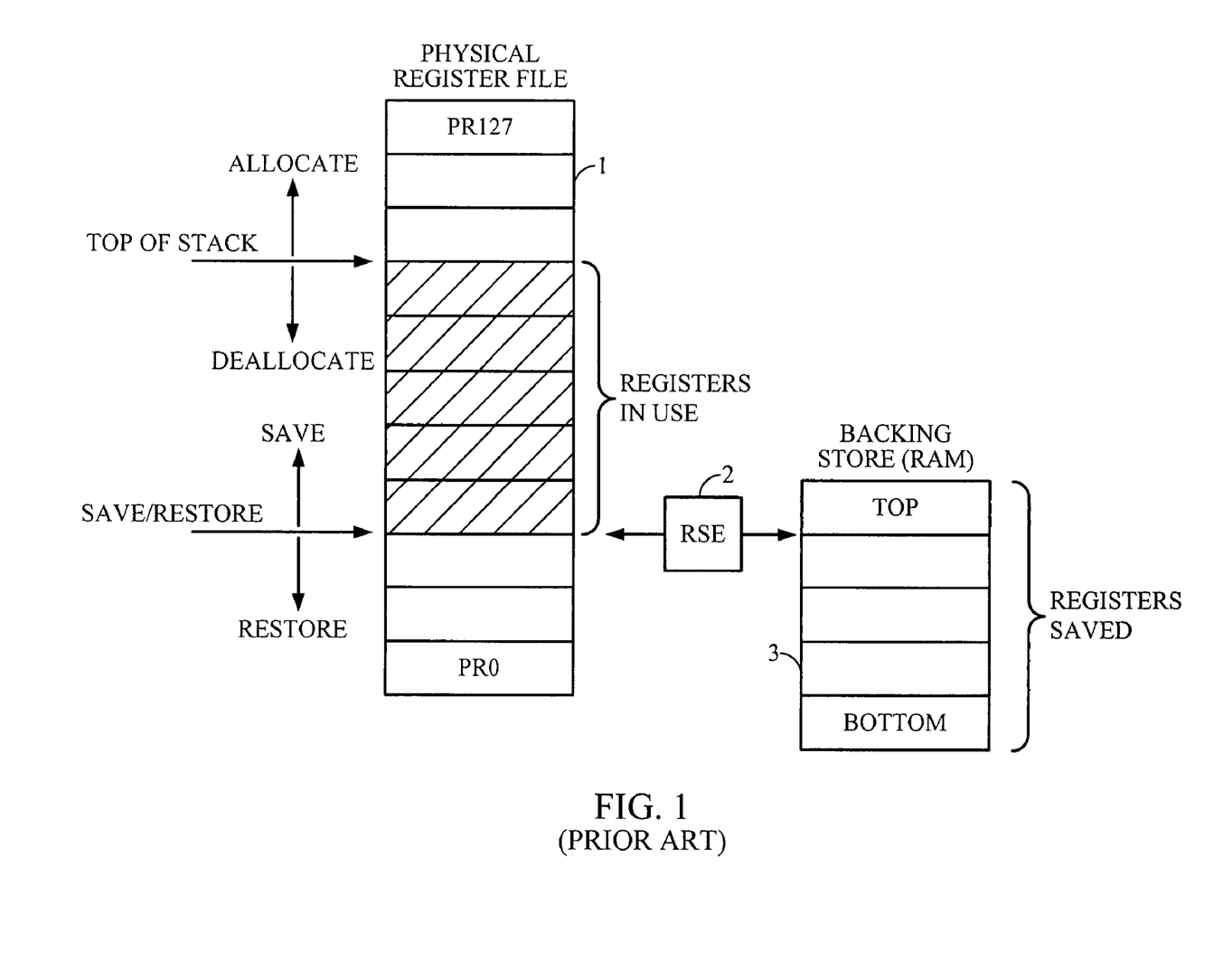
FIG. 1 is a block diagram of a prior art stacked register file.

FIG. 1 depicts a functional block diagram of a representative stacked register file architecture implementation. The Physical Register File 1 comprises an array of high speed, multi-ported physical registers, the array including at least as many registers as there are GPRs in the instruction set architecture. For example, the Physical Register File 1 may comprise 128 registers, ranging from physical register 0 (PR0) at the bottom to physical register 127 (PR127) at the top. Two logical pointers implement stack management: a Top Of Stack pointer and a Save/Restore pointer.

Initially, both pointers are set to PR0. As procedures are called and registers are allocated thereto, the Top Of Stack pointer moves up. When nearly all available physical registers have been allocated, and a newly called procedure requires more registers than the number of unallocated registers remaining in the Physical Register File 1, the Top Of Stack pointer will "wrap," and begin allocating registers from the bottom of the Physical Register File 1, beginning with PR0. Before this occurs, however, a sufficient number of registers at the bottom of the Physical Register File 1 must have their contents saved to a Backing Store 3, such as system memory (RAM).

A Register Save Engine 2 interrupts the processor, and executes the instructions necessary to perform register read and memory store operations to save the contents of the least-recently allocated registers at the bottom of the Physical Register File 1 to the Backing Store 3. The Register Save Engine 2 increments the Save/Restore pointer, indicating that registers below the pointer are available for allocation to newly called procedures. When the Register Save Engine 2 completes the register save operation and relinquishes control of the processor, the processor controller allocates registers to the next procedure, and increments the Top Of Stack pointer, wrapping it and incrementing it past the registers whose contents were saved to the Backing Store 3, as those registers are re-allocated and utilized by the called procedure.

Similarly, as a called procedure completes execution and returns control to a calling procedure, the stack is popped, and the registers allocated to the called procedure are de-allocated, or made available for allocation to other procedures. If all data associated with the calling procedure is not still in the Physical Register File 1—that is, if one or more of the calling procedure's registers were re-allocated—the Register Save Engine 2 again interrupts the processor, retrieves the contents of the most recently saved registers from the Backing Store 3, restores the data to the Physical Register File 1, allocates the registers to the calling procedure, and increments the Save/Restore pointer to indicate that the registers are allocated and contain valid data.

The stacked register file system provides optimal performance with a large Physical Register File 1, with a relatively narrow depth of procedure nesting, and/or with relatively few registers allocated to each procedure. Under these conditions, the Top Of Stack pointer simply moves up and down through the Physical Register File 1, allocating and de-allocating registers to procedures as needed, with no delay. However, as the number of procedures increases, and/or one or more procedures requires a large number of registers, the processor experiences numerous interruptions by the Register Save Engine 2, to save data from and restore it to register in the Physical Register File 1 so that registers may be re-allocated to new procedures.

One way to increase performance of a stacked register file system is simply to increase the size of the Physical Register File 1. While this does provide higher performance, the registers in the Physical Register File 1 are usually high-speed, multi-ported registers. Each register may include, e.g., three to five read and write ports. Furthermore, for flexibility in operation scheduling and register allocation, a read port of each physical register must be routed to each execution pipe stage in each pipeline, and the write-back pipe stage in each pipeline must be connected to a write port of each register in the Physical Register File. Thus, increasing the size of the Physical Register File 1 is costly in terms of both gate count and wiring complexity. At any given time, only one procedure is executing, accessing only a small subset of the registers in the Physical Register File 1. Thus, increasing the size of the Physical Register File 1 incurs a significant area and complexity cost, with low utilization of the costly hardware.

SUMMARY

In one or more embodiments, a Backing Store Buffer is interposed between a Physical Register File and the Backing Store in a stacked register file architecture. The Backing Store Buffer allows data from registers allocated to inactive procedures to be temporarily stored on-chip, freeing registers in the Physical Register File to be re-allocated to new procedures. When procedures complete and return control to prior, inactive procedures, data associated with the inactive procedures may be retrieved from the Backing Store Buffer, if previously saved, and restored to registers in the Physical Register File, and the registers re-allocated to the inactive procedure. Data need only be written to the Backing Store, incurring the significant performance degradation and power consumption required for off-chip RAM access, when the Backing Store Buffer is full.

One embodiment relates to a method of managing a stacked register file system having a dedicated Backing Store Buffer. One or more registers from a Physical Register File are allocated to a first procedure, and data associated with the first procedure are stored in the allocated registers. Data associated with the first procedure are selectively saved to the dedicated Backing Store Buffer, and one or more registers allocated to the first procedure are released for allocation to a second procedure. Prior to continued execution of the first procedure, data associated with the first procedure are restored from the dedicated Backing Store Buffer to one or more registers and the registers are re-allocated to the first procedure.

Another embodiment relates to a processor. The processor includes a Physical Register File comprising at least as many registers as the number of General Purpose Registers defined in the processor instruction set architecture. The registers are dynamically allocated to software procedures. The processor also includes a Register Save Engine operative to selectively save data from registers allocated to inactive procedures and to restore data to the registers prior to the procedures becoming active. The processor further includes a Backing Store Buffer dedicated to the Register Save Engine and operative to store the data saved from the registers allocated to inactive procedures.

DETAILED DESCRIPTION

Figure 2:
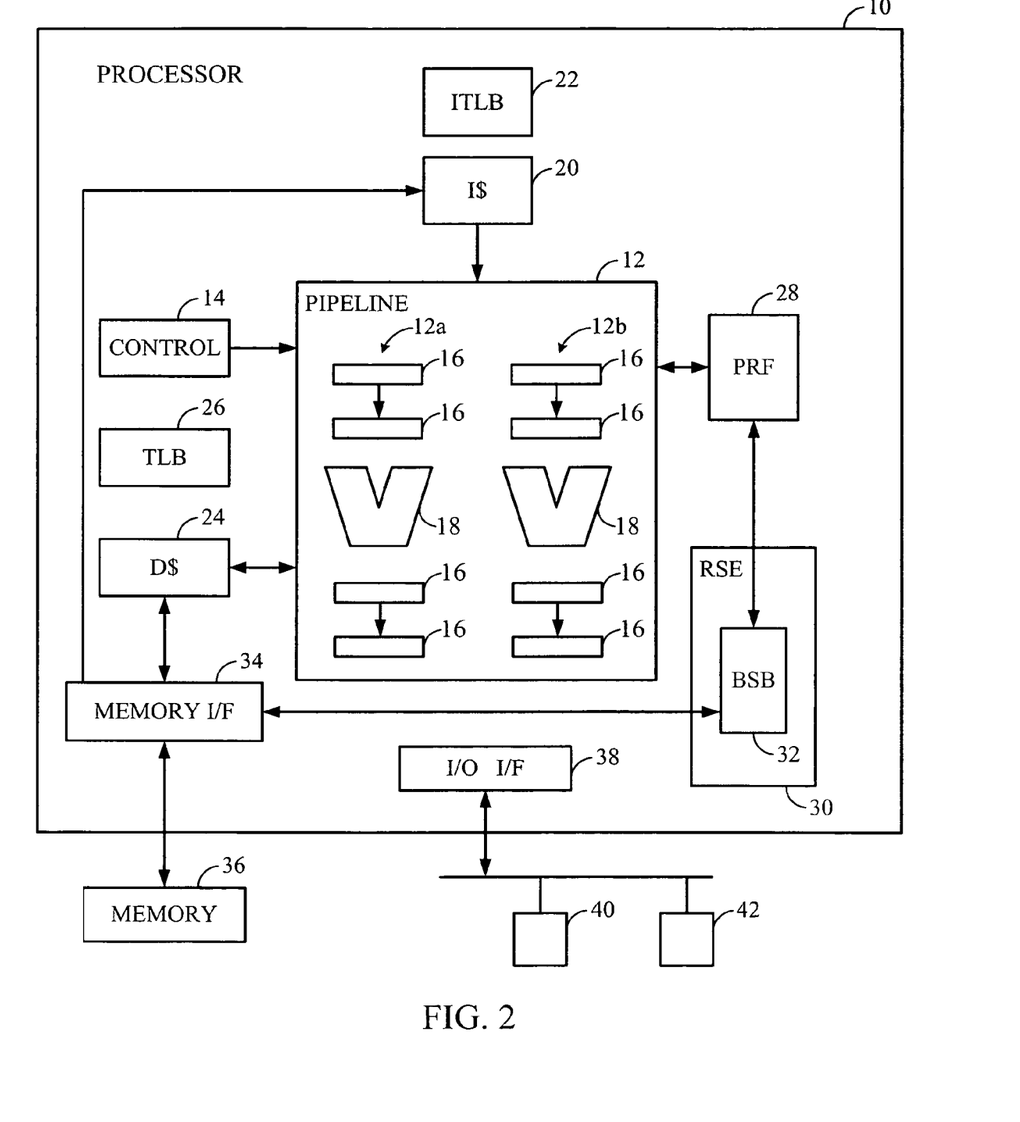
FIG. 2 is a functional block diagram of a processor.

FIG. 2 depicts a functional block diagram of a processor 10. The processor 10 executes instructions in an instruction execution pipeline 12 according to control logic 14. The pipeline 12 may be a superscalar design, with multiple parallel pipelines such as 12a and 12b. Each pipeline 12a, 12b includes various registers or latches 16, organized in pipe stages, and one or more Arithmetic Logic Units (ALU) 18. The pipelines 12a, 12b fetch instructions from an Instruction Cache (I-Cache or I$) 20, with memory addressing and permissions managed by an Instruction-side Translation Lookaside Buffer (ITLB) 22.

Data is accessed from a Data Cache (D-Cache or D$) 24, with memory addressing and permissions managed by a main Translation Lookaside Buffer (TLB) 26. In various embodiments, the ITLB 22 may comprise a copy of part of the TLB 26. Alternatively, the ITLB 22 and TLB 26 may be integrated. Similarly, in various embodiments of the processor 10, the I-cache 20 and D-cache 24 may be integrated, or unified. Misses in the I-cache 20 and/or the D-cache 24 cause an access to main (off-chip) memory 36, under the control of a memory interface 34.

Pipe stage registers or latches 16 and ALUs 18 may read operands from and/or write results to registers in a Physical Register File 28. The Physical Register File 28 is managed by a Register Save Engine 30, containing a Backing Store Buffer 32. The Backing Store Buffer 32 connects to main memory 36 via memory interface 34. The operation of the Physical Register File 28, Register Save Engine 30, and Backing Store Buffer 32 are described in greater detail below.

The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Figure 3:
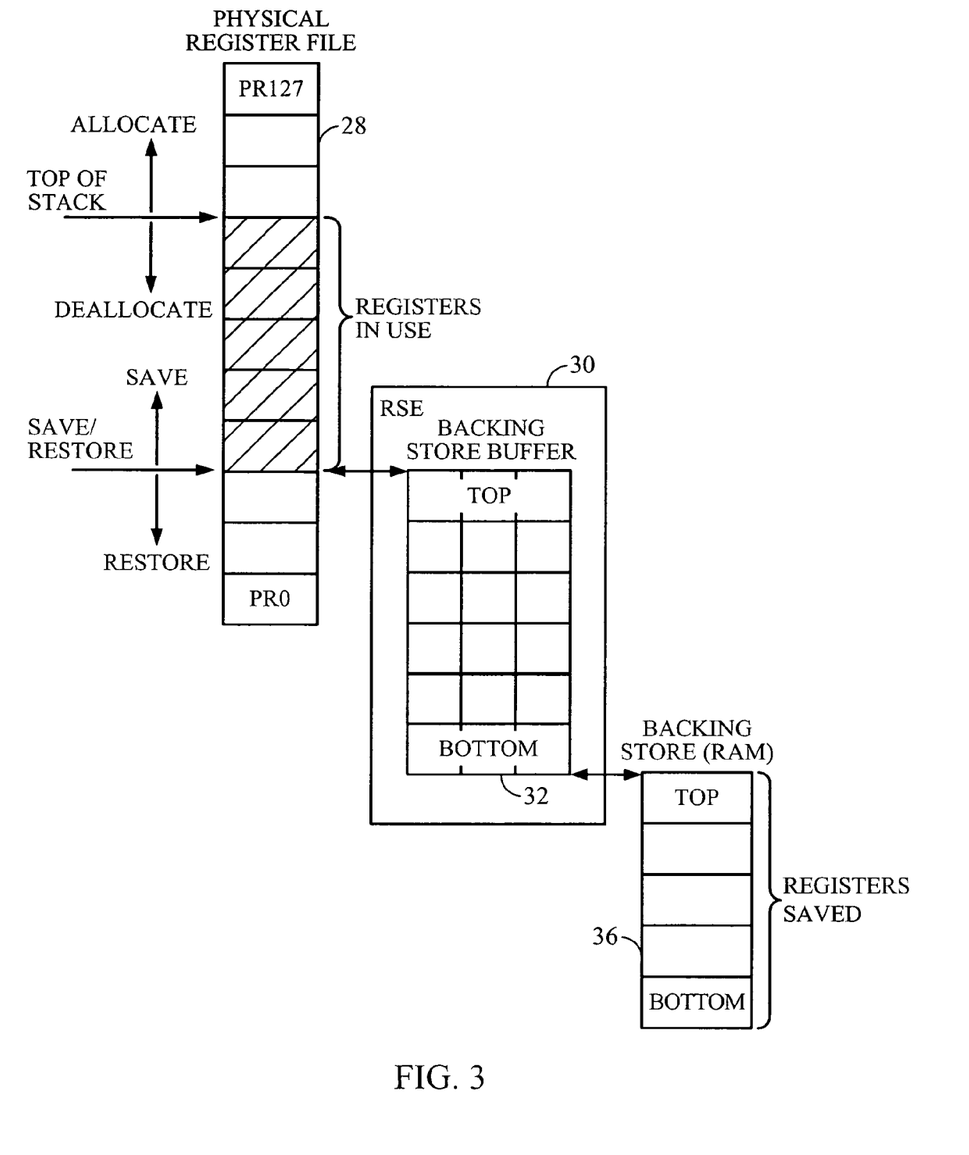
FIG. 3 is a functional block diagram of a stacked register file including a Backing Store Buffer.

FIG. 3 depicts a functional block diagram of the stacked register file architecture of the processor 10. A logically infinite register stack is implemented in a Physical Register File 28, which includes at least as many physical registers as the processor's instruction set architecture defines GPRs. As groups of registers are allocated to newly called procedures, a Top Of Stack pointer is incremented. Registers below the Top Of Stack pointer (and above the Save/Restore pointer) are allocated to procedures, and registers above the Top Of Stack pointer (and below the Save/Restore pointer) are free for allocation to new procedures. As a procedure completes execution and returns control to its calling procedure, the Top Of Stack pointer is decremented by the number of registers that were allocated to the completed procedure.

When a procedure is called and requests the allocation of more registers than the number of unallocated registers remaining in the Physical Register File 28, the Register Save Engine 30 saves data associated with inactive procedures—that is, data stored in registers allocated to inactive procedures—from the Physical Register File 28. Register Save Engine 30 increments the Save/Restore pointer, indicating that physical registers below the Save/Restore pointer (and above the Top Of Stack pointer) are available for allocation to new procedures.

Prior to an inactive procedure being activated, the Register Save Engine 30 checks the Physical Register File 28 to ensure that all of the registers that were allocated to the inactive procedure remain allocated to the inactive procedure, and hence contain data associated with the inactive procedure. If one or more of the registers previously allocated to the inactive procedure have been reallocated, then the Register Save Engine 30 restores saved data to available registers in the Physical Register File 28. Upon restoring the data, the Register Save Engine 30 decrements the Save/Restore pointer by the number of registers restored, indicating that the registers above the Save/Restore pointer (and below the Top Of Stack Pointer) are allocated to a procedure. The inactive procedure may then be activated, with all registers previously allocated to it containing the same data they contained when the procedure was inactivated. Those of skill in the art will note that in this discussion, the terms "above" and "below" the pointers are used for convenience, with reference to FIG. 3. In practice, either or both of the the Top Of Stack pointer and Save/Restore may "wrap," and their relative positions be inverted.

To avoid the delay and power consumption associated with the prior art practice of saving and restoring the contents of physical registers directly to a Backing Store 36 such as off-chip RAM, in one or more embodiments the Register Save Engine 30 includes a Backing Store Buffer 32. The Backing Store Buffer 32 temporarily stores data saved from and restored to registers in the Physical Register File 28. The Register Save Engine 30 need only access the Backing Store 36 to save data from the Backing Store Buffer 32 when the Backing Store Buffer 32 is full or approaching capacity. If the size of the Physical Register File 28, combined with the storage capacity of the Backing Store Buffer 32, is greater than or equal to the average stack depth, off-chip accesses to the Backing Store 36 are dramatically reduced.

For even higher performance, in one embodiment the Backing Store Buffer 32 is structured as an array of storage locations (e.g., registers, latches, or SRAM arrays) that have a bit width greater than that of the registers in the Physical Register File 28. In particular, entries in the Backing Store Buffer 32 may have a bit width that is an integral multiple of the width of the Physical Register File 28. This allows data from two or more physical registers to be stored side-by-side in a single Backing Store Buffer 32 entry.

In one embodiment, the integral multiple of bit width is equal to the number of read ports in the Physical Register File 28. For example, if the Physical Register File 28 includes three read ports, the Backing Store Buffer 32 is configured as an array of storage elements, each of which has a bit width three times that of registers in the Physical Register File 28 (as depicted in FIG. 3). In this configuration, the Register Save Engine 30 may read data from three physical registers simultaneously—that is, in a single cycle—and may write the data from all three registers to a single Backing Store Buffer 32, in a single write cycle. This minimizes the performance overhead of saving data from the Physical Register File 28 when registers are de-allocated from inactive procedures. Similarly, if the Physical Register File 28 additionally includes three write ports, then upon restoring data to the Physical Register File 28, the Register Save Engine 30 may read data to be restored to three physical registers in a single cycle, from a single Backing Store Buffer 32 entry. These data may be written to three registers in the Physical Register File 28 in a single cycle.

The Backing Store Buffer 32 may be implemented in a number of technologies and operational configurations. For example, the Backing Store Buffer 32 may comprise an array of simple, single-port, high-speed registers or latches. Alternatively, the Backing Store Buffer 32 may be implemented as an SRAM array, configured as an n×m array where n is the bit width of each Backing Store Buffer 32 entry, and m is the number of such entries. Regardless of the hardware configuration, the Backing Store Buffer 32 may be implemented in a variety of operational configurations, such as a stack, a FIFO, a cache memory indexed by the context_ID of the procedure associated with the data, or the like.

Regardless of the physical or operational configuration, however, the Backing Store Buffer 32 is dedicated to the Register Save Engine 30. That is, the memory storage locations in the Backing Store Buffer 32 are not part of the instruction set architecture, and may not be addressed by instructions. Additionally, the Backing Store Buffer 32 stores only data contained in registers in the Physical Register File 28 at the time procedures to which those registers were allocated to go inactive. That is, the Backing Store Buffer 32 is separate from scratch registers, cache memory, or any other processor memory or storage locations, whether on- or off-chip. As used herein, the term "dedicated" Backing Store Buffer indicates this physical and functional isolation of the Backing Store Buffer 32 from the rest of the processor 10.

In one embodiment, the Backing Store Buffer 32 is operationally configured as a stack. The Register Save Engine 30 reads data from the Physical Register File 28 and pushes the data onto the top of the stack. Conversely, the Register Save Engine 30 pops the stack to retrieve data to be restored to the Physical Register File 28. As the Backing Store Buffer 32 fills or, in some embodiments, approaches capacity, the Register Save Engine 30 reads data from the bottom of the stack, and stores the data to the Backing Store 36, with may comprise an L1 or L2 cache, or main system memory (e.g., RAM), as depicted in FIG. 2. When the Register Save Engine 30 restores sufficient data from the Backing Store Buffer 32 to the Physical Register File 28, freeing up capacity in the Backing Store Buffer 32, the Register Save Engine 30 reads previously saved data from the Backing Store 36, writing the data to the bottom of the stack in the Backing Store Buffer 32. Note that operating the Backing Store Buffer 32 as a stack is independent of the bit width of the Backing Store Buffer 32 entries.

In one embodiment where the Backing Store Buffer 32 operates as a stack, for optimum performance the Backing Store Buffer 32 is configured as an array of dual-ported registers, with the top and bottom of the stack being maintained by pointers, similar to those described above with respect to the Physical Register File 28. This allows, for example, the Register Save Engine 30 to push data saved from the Physical Register File 28 onto the top of the Backing Store Buffer 32 stack at the same time data is being saved from the bottom of the Backing Store Buffer 32 stack to the Backing Store 36. Similarly, data may be restored from the Backing Store 36 to the bottom of the Backing Store Buffer 32 stack at the same time data is popped from the top of the stack to restore to the Physical Register File 28.

In an alternate embodiment, to reduce circuit complexity and silicon area, the Backing Store Buffer 32 stack is constructed from single-port registers, with the Register Save Engine 30 scheduling writes to and reads from the Backing Store around operations that save data from and restore data to the Physical Register File 28.

Figure 4:
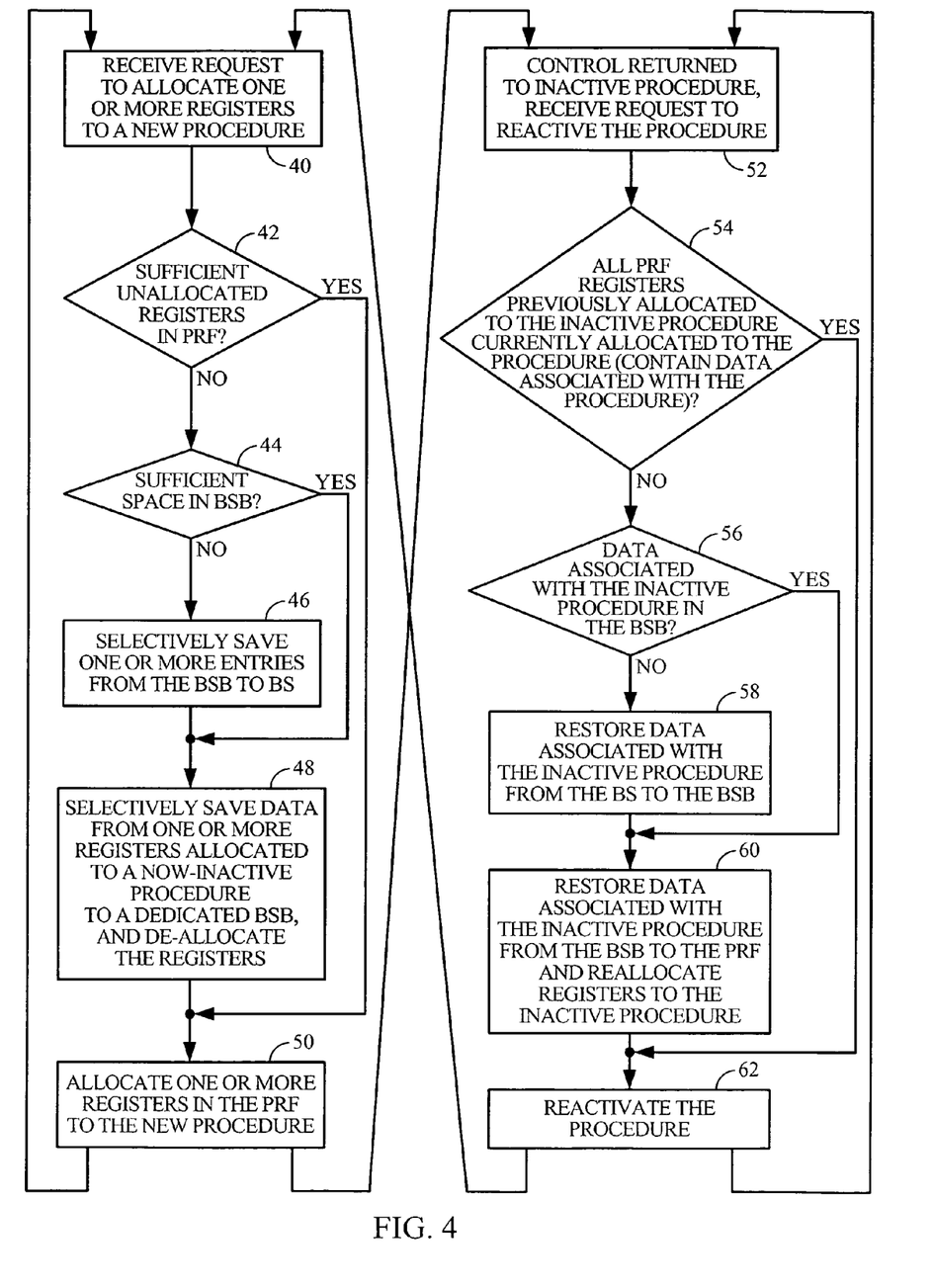
FIG. 4 is a flow diagram of a method of managing a stacked register file architecture.

A method of operating a stacked register file architecture according to one embodiment is depicted in flow diagram form in FIG. 4. Initially, a stacked register controller, which may comprise the Register Save Engine (RSE) 30, receives a request to allocate one or more registers in the Physical Register File (PRF) 28 for exclusive use by the procedure to write and read data, such as operands for or results of arithmetic or logical instructions (block 40). The RSE 30 determines whether there are sufficient unallocated registers remaining in the PRF 28 (block 42). Initially, there are, and the requested number of PRF 28 registers are allocated to the new procedure (block 50). This process may repeat several times, as each procedure calls a successive procedure (block 40).

At some point, a procedure is called and register allocation requested (block 40), but insufficient unallocated registers remain in the PRF 28 to satisfy the request (block 42). The RSE 30 then determines how many registers in the PRF 28 must be freed up to satisfy the request, and determines whether a concomitant amount of free space is available in the Backing Store Buffer (BSB) 32 (block 44). If so, at least a sufficient number of registers that are allocated to one or more currently inactive procedures are de-allocated by saving their contents to the BSB 32 (block 48). The RSE 30 then allocates these de-allocated registers, along with existing de-allocated registers in the PRF 28, to the requesting new procedure (block 50), which may proceed with execution and store data in its allocated PRF 28 registers.

If sufficient new procedures are called, and/or if the new procedures require large allocations of registers, the BSB 32 may fill or approach its capacity. In this case, upon a request by a new procedure (block 40), if there are insufficient registers in the PRF 28 (block 42) and insufficient free space in the BSB (block 44), the RSE 30 will save older entries from the BSB 32 to the Backing Store (BS) 36, such as off-chip RAM (block 46). Data may then be saved from the PRF 28 to the BSB 32 (block 48), and the freed PRF 28 registers allocated to the new procedure (block 50). This process may repeat as new procedures are called (block 40).

At some point, rather than calling a new procedure (block 40), an active procedure will terminate, and return control to its calling procedure, which will request reactivation (block 52). The RSE 30 will check to determine if all registers originally allocated to the inactive procedure remain allocated to it in the PRF 28 (block 54). If so, all the data written by the procedure, before it called another procedure and became inactive, remains in the PRF 54 and the procedure may reactivate and resume execution (block 62).

If the RSE 30 saved data from one or more registers originally allocated to inactive procedure and allocated the registers to another procedure, the RSE 30 checks to see if the data is stored in the BSB 32. If so, the RSE 30 reads at least the data associated with the inactive procedure from the BSB 32, and writes it to registers in the PRF 28, allocating the registers to the inactive procedure (block 60). The inactive procedure is then reactivated (block 62).

If data associated with the inactive procedure has been saved from the PRF 28 (block 54), and is not stored in the BSB 32 (block 56), then the data has been saved from the BSB 32 to the BS 36. In this case, the RSE 30 reads at least the data associated with the inactive procedure from the BS 36 and writes it to the BSB 32 (block 58). The RSE 30 then restores the data from the BSB 32 to the PRF 28, allocating the receiving registers to the inactive procedure (block 60) prior to reactivating the procedure (block 62). The reactivated procedure may then call another procedure (block 40), or may itself complete execution and return control to a prior calling procedure (block 52).

Those of skill in the art will recognize numerous obvious variations of and optimizations to the above procedures, in light of the teaching of the present disclosure. For example, when data has been saved all the way to the BS 36, and is required to reactivate a procedure, the RSE 30 may bypass the BSB 32, and write the data directly from the BS 36 to registers in the PRF 28. Additionally, particularly in an embodiment as describe herein where the width of each BSB 32 entry is the width of a PRF 28 register times the number of PRF 28 read ports, data may not be stored from or restored to the PRF 28 (or BSB 32) along procedure boundaries. That is, not all of the data associated with an inactive procedure may be saved from the PRF 28 at the same time. Similarly, when restoring data associated with one inactive procedure to the PRF 28, the RSE 30 may additionally restore data associated with another procedure (with additional data associated with the other procedure remaining stored away in the BSB 32 or BS 36).

By providing dedicated, local, high-speed storage, the Backing Store Buffer 32 allows the Register Save Engine 30 to save and restore data from the Physical Register File 28 without incurring the significant degradation and power consumption associated with writing the saved data to an off-chip Backing Store. The Backing Store Buffer 32 is an economic alternative to increasing the size of the Physical Register File 28, as the Backing Store Buffer 32 does not need to be multi-ported, or connected to pipe stages in one or more execution pipelines.

In fact, the presence of the Backing Store Buffer 32 allows the Physical Register File 28 to include only the number of registers defined as GPRs in the instruction set architecture. That is, since a procedure may theoretically be allocated to all defined GPRs, the number of GPRs in the instruction set architecture places a lower bound on the size of the Physical Register File 28. The Backing Store Buffer 32 of the present invention allows that same number to serve as an upper bound on the size of the Physical Register File 28 to contain silicon area and wiring complexity, while obtaining the high performance and low power consumption of avoiding or minimizing off-chip accesses to a Backing Store 36.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of managing a register file system, the method comprising:

reading concurrently first data from a first read port of a register file and second data from a second read port of the register file;

saving the first data comprising complete contents of a first register of the register file to a buffer outside of the register file when a first procedure associated with the first data is inactive, wherein the buffer includes a plurality of storage locations that are not addressable by processor instructions and that enable temporary on-chip storage of the first data while the first procedure remains inactive;

saving the second data comprising complete contents of a second register of the register file to the buffer, wherein the first data from the first read port and the second data from the second read port are saved into a single storage location of the buffer during a single write cycle;

initiating a transfer of the first data from the buffer to a second storage device when an amount of data stored at the buffer approaches a storage capacity of the buffer;

receiving a request to allocate a specified number of registers of the register file to a second procedure; and determining whether the register file includes sufficient unallocated registers to accommodate the request, wherein the first data is saved to the buffer when the register file does not include sufficient unallocated registers to accommodate the request;

wherein the first procedure is further associated with third data that is stored at a third register of the register file and the third data is not saved to the buffer when the register file does not include sufficient unallocated registers to accommodate the request; and wherein the buffer includes an array of storage elements, each of the storage elements having a bit width that is an integral multiple of a bit width of the register file.

2. The method of claim 1, wherein the second storage device comprises a backing store, and wherein a controller saves the first data to the buffer and initiates the transfer of the first data to the backing store.

3. The method of claim 1, wherein the buffer is configured as a stack, wherein saving the first data to the buffer includes pushing the first data onto a top of the stack, and wherein initiating the transfer of the first data to the second storage device includes reading the first data from a bottom of the stack.

* * * * *